United States Patent [19]

Iida et al.

[11] Patent Number: 5,086,309
[45] Date of Patent: Feb. 4, 1992

[54] IMAGE FORMING APPARATUS

[75] Inventors: Kazuhiko Iida; Masahiro Koiwai, both of Suwa, Japan

[73] Assignee: Seiko Epson Corporation, Tokyo, Japan

[21] Appl. No.: 547,351

[22] Filed: Jul. 2, 1990

[30] Foreign Application Priority Data

Jul. 3, 1989 [JP] Japan .................................. 1-172684

[51] Int. Cl.⁵ ...................... G01D 15/14; G03G 21/00; H04N 1/23
[52] U.S. Cl. .................................. 346/160; 355/316; 355/323; 358/300
[58] Field of Search ................ 358/300; 355/316-323; 346/160

[56] References Cited

U.S. PATENT DOCUMENTS 4,794,419 12/1988 Shibazaki et al. ............... 358/300 X
4,797,706 1/1989 Sugishima et al. ................... 355/316
4,860,115 8/1989 Ogura ............................. 358/300 X
4,992,882 2/1991 Ikenoue et al. ....................... 358/300

Primary Examiner—George H. Miller, Jr.
Attorney, Agent, or Firm—Blum Kaplan

[57] ABSTRACT

A page printer and system including a page printer. The page printer and each paper handling accessory device within the system includes a control unit. The control unit of the printer includes a main control unit and an auxiliary control unit. The main control unit supplies at least recording format data associated with the recording format of the recording data to the auxiliary control unit. The main control unit also inspects the specifications of each accessary device which have been previously stored in the auxiliary control unit to place the system in a standby state prior to receiving instructions to begin printing. The auxiliary control unit stores the specifications associated with each optional device and the recording format data and controls the operation of the page printer and each accessary device.

40 Claims, 4 Drawing Sheets

IMAGE FORMING APPARATUS

BACKGROUND OF THE INVENTION

This invention relates to an image forming apparatus, more particularly an image forming apparatus such as, but not limited to, a page printer which includes an optical signal generator (i.e., optical beam write device) and which is part of a printing system having a paper feeder, a sorter and/or a jogger.

An image forming apparatus such as an optical beam write-type page printer includes a photosensitive drum positioned along a paper path within the printer which extends from a sheet feeding port to a sheet exhausting port. The surface conductivity of the photosensitive drum changes based on an optical beam applied thereto produced by an optical signal generator (i.e., optical beam write device). The printer also includes an electrostatic charging device for uniformly charging the surface of the photosensitive drum. The optical beam, which is representative of the image to be formed, passes through an optical beam radiating window prior to striking the surface of the photosensitive drum.

Initially, the photosensitive drum is uniformly electrically charged, either negatively or positively, by the electrostatic charging device. As the photosensitive drum continues to rotate, certain areas thereof are irradiated with light representing the image information generated by the optical signal generator. A static latent image formed on the surface of the photosensitive drum then passes a toner developing device. Toner is deposited on the photosensitive drum in accordance with the static latent image to form a toner image. The toner image is then transferred to a recording medium (i.e., sheet of paper) by a transfer device. Excess toner which has not been transferred onto the sheet of paper is removed by a cleaning device (i.e., toner recovering device).

Such image forming apparatus produces, at a high speed, a high quality pattern of characters based on the principles of xerography. A relatively small number of pages is generated using such printers. When a large number of pages are to be printed, optional devices such as an automatic sheet feeder for feeding the sheets of paper and a sorter for sorting the sheets of paper are used in combination with the printer. Adding the feeder and sorter to the printer requires the configuration of the printer be standardized so as to accommodate the addition of these optional features to the printer.

The addition of an automatic sheet feeder and sorter to the printer requires that the printer include a host device. The host device, which is typically a small computer, provides data to the automatic sheet feeder for feeding sheets of paper to the printer and information to the sorter for sorting the sheets of paper from the printer. Since printers vary in configuration (i.e., specifications), optional devices such as automatic sheet feeders and sorters when used with these different printers must also vary in design (i.e., configuration).

It is therefore desirable to provide an image forming apparatus which can be used with a number of different types of optional devices such as, but not limited to, automatic sheet feeders, sorters and the like. In particular, the image forming apparatus should have a high degree of compatibility with a variety of different types of optional devices.

SUMMARY OF THE INVENTION

Generally speaking, in accordance with the invention, a page printer and printing system including a page printer include control circuitry for placing the page printer and optional devices within the printing system in a standby state prior to receiving instructions to begin the printing operation. An extremely efficient printing system having a high printing speed results. The control units of the page printer and each optional device are designed to communicate with each other prior to and during the printing operation. Consequently, a printer having a high degree of compatibility with a variety of different types of optional devices is provided.

In accordance with the invention, the image forming apparatus in combination with at least one optional device for handling recording medium includes a recording device for recording the image on a recording medium based on the recording data. The image forming apparatus also includes a main control device for supplying to an auxiliary control device at least recording format data associated with the recording format of the recording data and for inspecting the specifications of each optional device stored in the auxiliary control device. The auxiliary control device stores the specifications associated with each optional device and the recording format data and controls the operation of the recording device and each optional device.

The recording device includes an optical signal generator for producing a modulated light beam representing the recording data, a photosensitive drum for receiving the modulated light beam to form a latent image thereon and a toner developing device for depositing toner on the photosensitive drum to change the latent image to a toner image. The image forming apparatus also includes a transfer device for transferring the toner image to the recording medium and a fixing device for permanently fixing the toner image to the recording medium.

Typically, the recording device is a page printer and the optional devices include an automatic sheet feeder and a sorter. The auxiliary control device includes timing signals to coordinate the operation of the printer with each of the optional devices.

Since the auxiliary control device saves the format data corresponding to a number of different pages of the recording medium, the auxiliary control device can provide instructions to the printer and each optional device regarding the next printing operation without having to wait for data from the main control device after printing of the last page has been completed. The print system is therefore kept in a standby state by adjusting the printer and each optional device regarding the next page of recording medium to be printed prior to such printing beginning. The speed at which the next page of recording medium is printed is thereby significantly increased. The compatibility of the printer with each optional device is therefore further enhanced.

Accordingly, it is an object of the invention to provide an improved image forming apparatus which has a high degree of compatibility with a variety of different types of optional devices.

It is another object of the invention to provide an improved image forming apparatus such as a page printer which can be used with a number of different types of automatic sheet feeding and sorting devices.

Still other objects and advantages of the invention will, in part, be obvious and will, in part, be apparent from the specification.

The invention accordingly comprises the several steps and the relation of one or more such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENT

Figure 1:
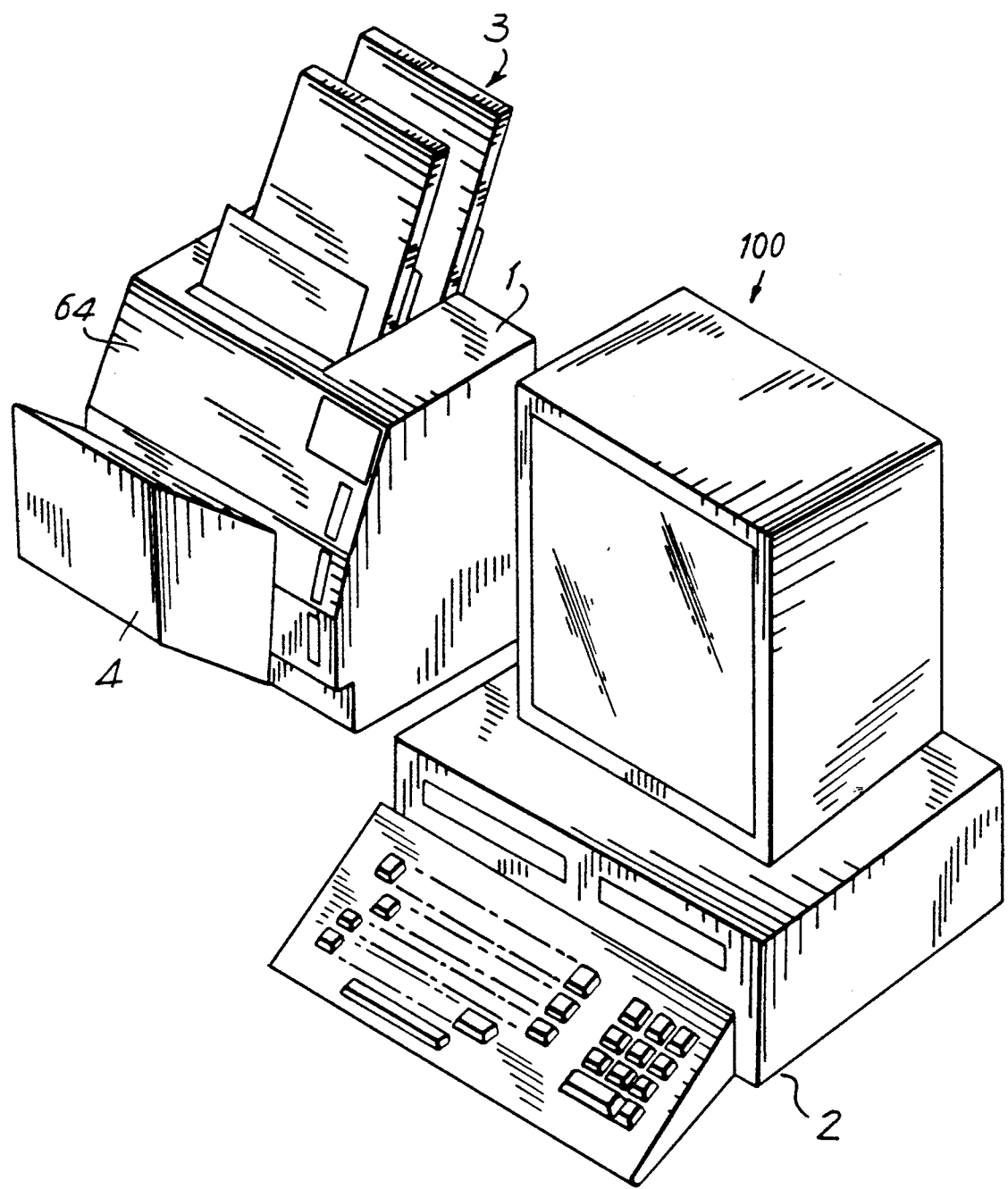
FIG. 1 is a perspective view of a printing system in accordance with the invention.

As shown in FIG. 1, a printing system 100 includes a printer 1 operating on the well known principles of xerography and a host device 2 connected to printer 1. Host device 2 is part of a small computer which communicates with printer 1 through a cable (not shown). Printer includes an automatic sheet feeder 3 positioned above and in communication with the sheet feeding port of printer 1. A sorter 4 is connected to the lower half of printer 1 and in communication with the sheet exhausting port of printer 1.

Figure 2:
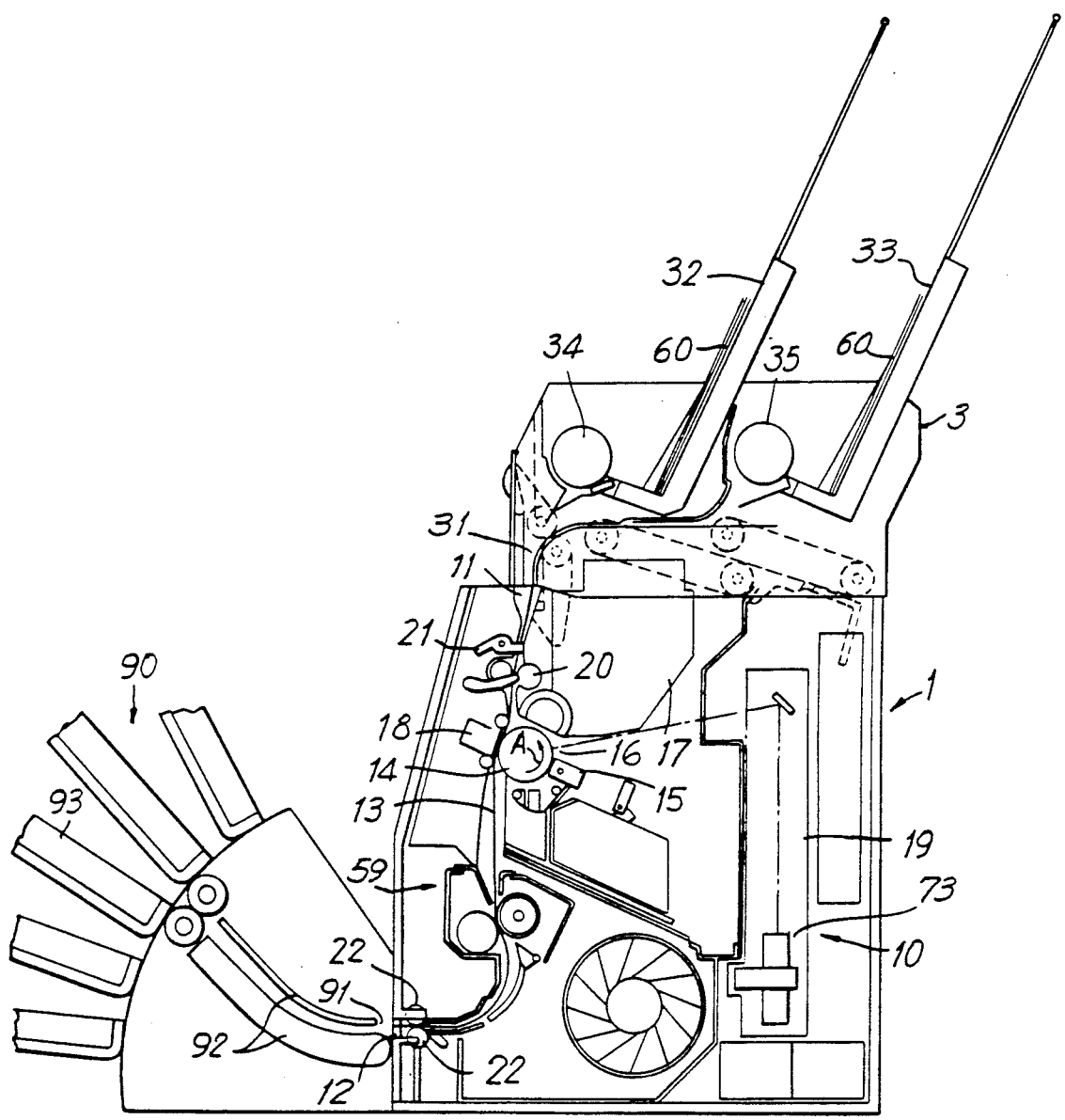
FIG. 2 is a sectional view of a printer and automatic sheet feeder of FIG. 1.

As shown in FIG. 2, printer 1 includes a printing mechanism 10 which includes a photosensitive drum 14 positioned within printer 10 to permit the surface of photosensitive drum 14 to come into contact with a sheet of paper 60 as the paper travels along a printing path 13. Printing path 13 begins from a sheet feeding port 11 and ends at a sheet exhausting port 12. As photosensitive drum 14 rotates in a direction represented by an arrow A, certain areas thereof are irradiated with light in accordance with the image information generated by an optical signal generator (i.e., optical beam write device) 19. An optical beam, representing the image information generated by optical signal generator 19, travels through an entrance window 16 before irradiating the surface of photosensitive drum 14. A static latent image on the surface of photosensitive drum 14 forms and passes a toner developing device 17. The toner is deposited on photosensitive drum 14 in accordance with the static latent charge to form a toner image on photosensitive drum 14. The toner image is then transferred onto a sheet of paper 60 on path 13 by transfer device 18.

Toner developing device 17, transfer device 18, and optical signal generator 19 are sequentially arranged within printer 1 around photosensitive drum 14 with toner developing device 17 positioned near the beginning of path 13.

Optical signal generator 19 includes a rotary polygon mirror 73. Mirror 73 is driven by a motor 83 (shown in FIG. 3). A laser beam source (not shown) of generator 19 is modulated based on the printing data to produce the optical beam.

Exhaust port 12 is located at the end of path 13. A gate roller 20 and a sheet detector 21 operate in combination to advance the sheet of paper 60 based on the rotational speed of photosensitive drum 14. A pair of exhaust rollers 22 are located near exhaust port 12. Near exhaust rollers 22 but on the upstream side of path 13 is a fixing unit 59 for thermocompression-bonding of toner which has been transferred onto the surface of the sheet of paper 60 by transfer device 18. Printer 1 also includes a control unit I, shown in FIG. 3, for controlling the operation of printing mechanism 1.

Automatic sheet feeder which automatically feeds individual sheets of paper into sheet feeding port 11, has an exhaust portion 31 located adjacent and opposite to sheet feeding port 11. Feeder 30 also includes a pair of stackers 32 and 33 for retaining the sheets of paper 60 to be printed on, sheet exhausting rollers 34 and 35 for advancing individual sheets of paper 60 from stackers 32 and 33, respectively and a control unit II (shown in FIG. 3), for controlling a driving mechanism.

A sorter 90 for feeding and sorting sheets of paper is attached to printer 1 such that a sheet entering port 91 of sorter 90 is located in opposition to sheet exhausting port 12 of printer 1. Sorter 90 also includes classifying plates 92 for classifying a printed sheet to direct it to the desired one of trays 93 and a control unit III shown in FIG. 3.

Figure 3:
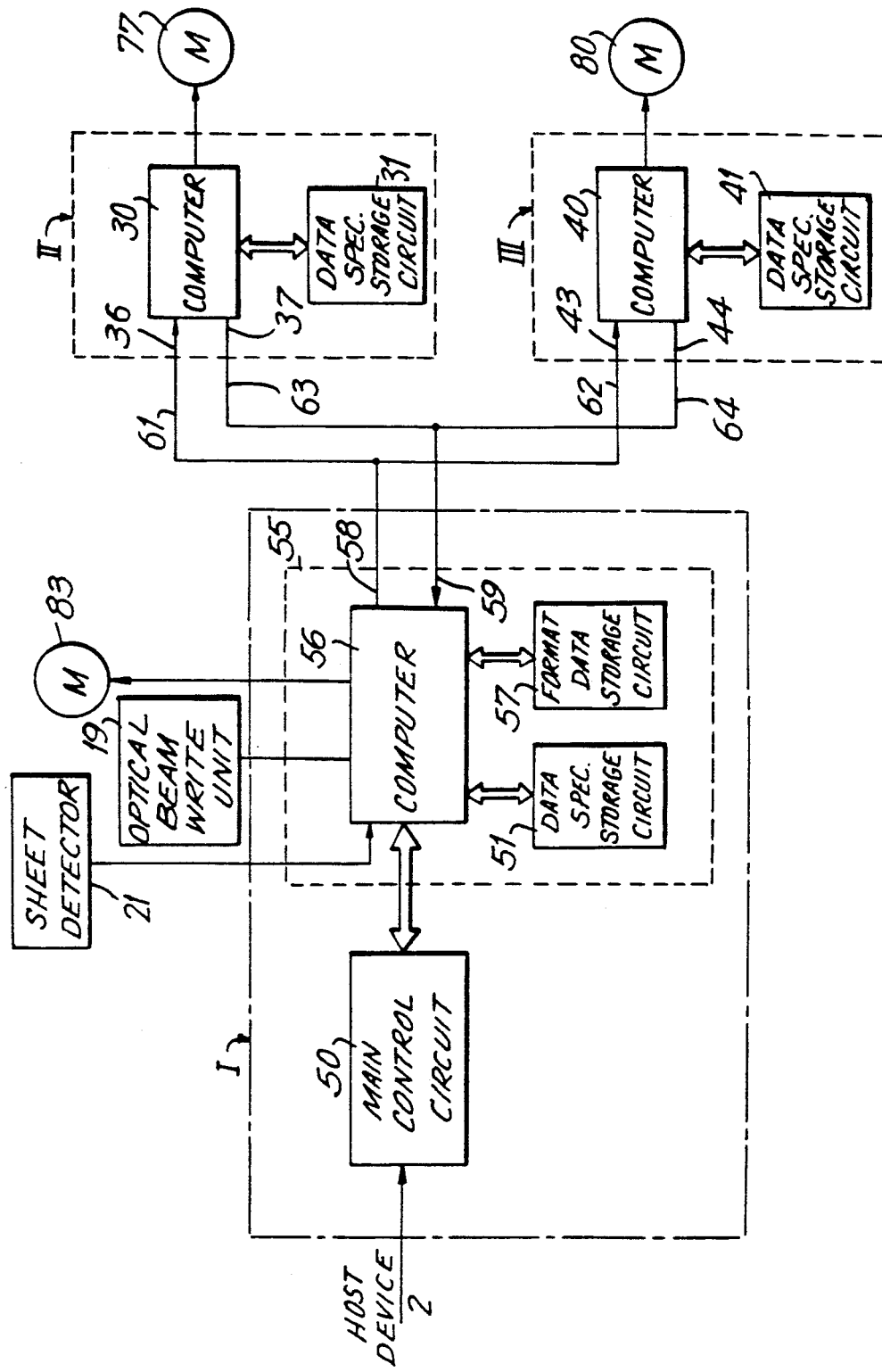
FIG. 3 is a block diagram of the control circuitry for the printing system of FIG. 1.

As shown in FIG. 3, three different control units are required for controlling printing system 100. Control unit I is included in printer 1, control unit II is included in automatic sheet feeder 3 and control unit III is included in sorter 90.

Control unit I includes a main control unit 50 and an auxiliary (printing mechanism) control unit 55. Control unit 50 receives and outputs printing data from host device 2 to printing mechanism control unit 55, interprets control instruction inputs from host device 2 and a user control panel 64 of printer 1 and outputs the result of the interpretation to printing mechanism control unit 55.

Printing mechanism control unit 55 controls the operation of printing mechanism 10 of FIG. 2. Included within printing mechanism control unit 55 is a microcomputer 56 which includes a central processing unit (CPU), a random access memory (RAM) and a read only memory unit (ROM). Also included in printing mechanism control unit 55 is a printing format data storage circuit 57 (discussed below) and a data specification storage circuit 51. Circuit 51 saves data regarding the specifications of automatic sheet feeder 3 and sorter unit 4.

Microcomputer 56 controls the speed of revolution of motor 83 which drives rotary polygon mirror 73 for scanning. Such scanning is based on a presaved program stored in microcomputer 56. Microcomputer 56 also controls a reference timing to control the start of scanning position and timing of the optical beam as well as controlling the revolution speed of photosensitive drum 14 and the operation of electrostatic charging unit 15, toner developing device 17 and transfer device 18. The status of printing mechanism 10, represented by a status signal, is also supplied by microcomputer 56 to main control unit 50. The printing format data for automatic sheet feeder 3, sorter 4 (i.e., sheet exhausting unit) and sheet size is saved in format data storage circuit 57 and is also controlled by microcomputer 56. Timing signals for controlling the feeding of a sheet of paper 60 by automatic sheet feeder unit and the sorting of a sheet of paper by sorter 4 are outputted at a terminal 58 of control unit I which is also controlled by microcomputer 56.

Control unit II which is disposed within automatic sheet feeder 3, includes a microcomputer 30 having a CPU, a RAM and a ROM. The timing signal produced by printing mechanism control unit 55 is inputted to a terminal 36 of control unit II and controls a motor 77 of automatic sheet feeder 3 for driving sheet exhausting rollers 34 and 35. Control unit II also includes data specification storage circuit 31 for saving specification data of automatic sheet feeder 3. Such data can include, for example, bin numbers and sheet exhausting speed. The specification data can be outputted through a terminal 37 in response to an inquiry from outside control unit II.

Control unit II which is disposed within sorter 90 includes a microcomputer 40. Similar to microcomputers 56 and 30, microcomputer 90 includes a CPU, a RAM and a ROM. Computer 40 controls a motor 80 which drives classifying plates 92 in response to a timing signal produced by printing mechanism control 55 inputted to microcomputer 40 at an input terminal 43. Control unit III also includes a data specification storage circuit 41 for saving the specification data of sorter unit 90. Such data, for example, includes a sort timing and a classification number and can be outputted through a terminal 44 in response to a inquiry from outside control unit III.

Printer 1 is designed for automatic sheet feeder 3 to be attached to the top of printer 1 for feeding sheets of paper 60 into sheet feeding port 11 and for sorter unit 4 to be attached to the side of printer 1 for receiving sheets of paper 60 from sheet exhausting port 12. Control unit I of printer 1 is connected to control unit II of automatic sheet feeder 3 through a pair of signal cables 61 and 63 and to control unit III of sorter 4 through a pair of signal cables 62 and 64. Terminals 58 and 59 of microcomputer 56 are coupled to automatic sheet feeder 3 and sorter 4 in a daisy-chain manner.

Figure 4:
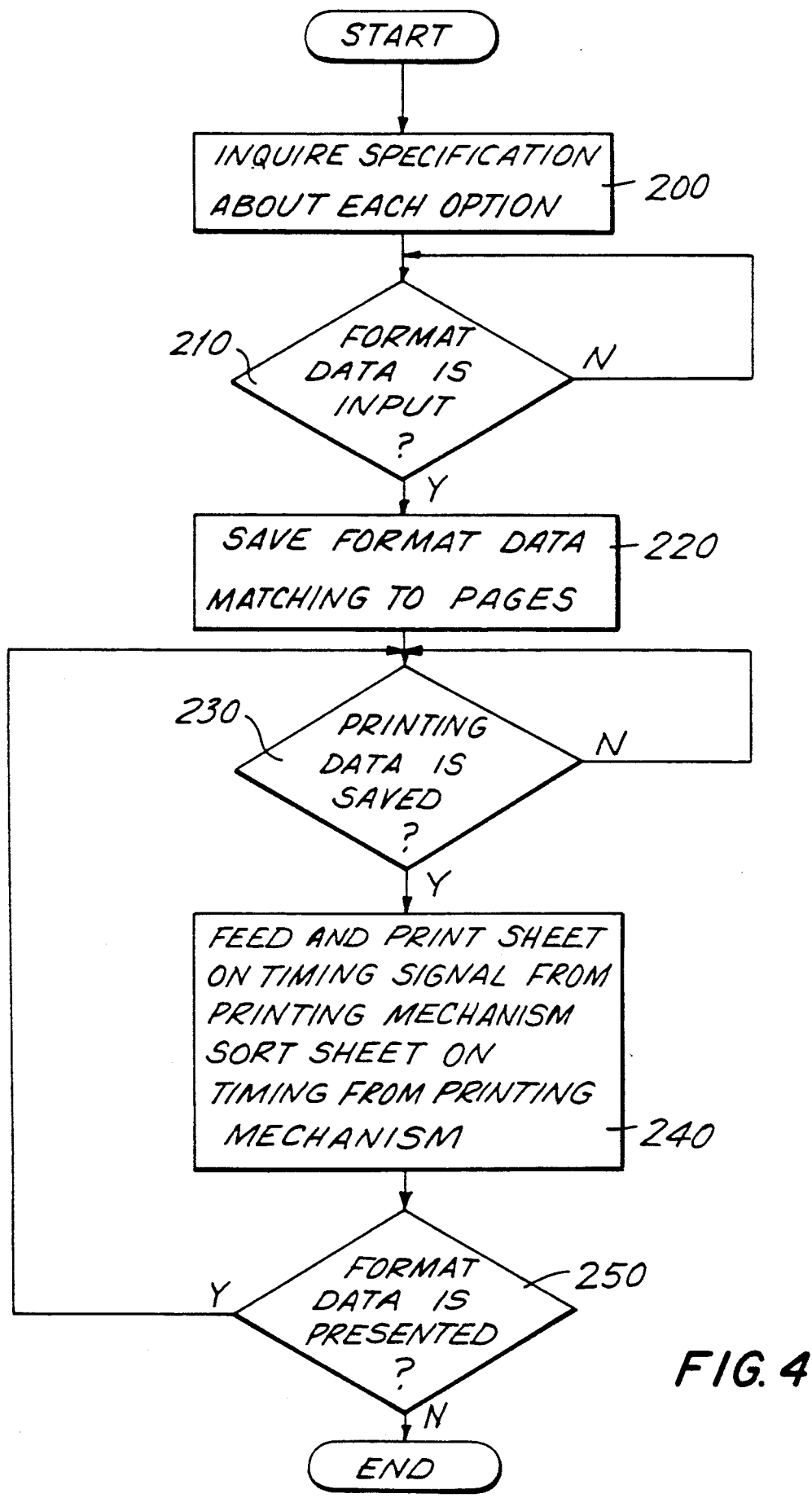
FIG. 4 is a flow chart illustrating the operation the printing system.

The operation of the system 100 is illustrated in FIG. 4. When electric power is supplied to system 100, printing mechanism control unit 55 generates an inquiry signal about the specifications of automatic sheet feeder 3 and sorter 4 under a step 200. Such specifications can include, but are not limited to, bin number and sheet feeding speed. The inquiry signal is outputted from terminal 58 of computer 56 and is supplied through signal cables 61 and 62 to input terminals 36 and 43 of control units II and III in a daisy-chain manner, respectively.

Control unit II of automatic sheet feeder 3 outputs the specification data of, for example, bin number and sheet feeding speed saved in specification data storage circuit 31 through terminal 37 to terminal 59 of control unit I in response to the inquiry signal by printing mechanism control unit 55. In response to the inquiry signal by printing mechanism control unit 55, control unit III of sorter 90 outputs, for example, the sorting speed and classifying number saved in specification storage circuit 1 through terminal 44 to terminal 59 of printing mechanism control unit 55. The data outputted by control units II and III at terminals 37 and 44 travel through cables 63 and 64 to terminal 59 in a daisy-chain manner, respectively. The data received at terminal 59 of printing mechanism control unit 55 is saved in data specification storage circuit 51.

Based on the inquiry signal generated by printing mechanism control unit 55, the data saved in specification data circuit 51 represents the present environmental variables of system 100. Main control unit 50 obtains the present overall system status including these environmental variables based on inquiry signals produced by main control 50 and received by printing mechanism control unit 55. Main control unit 50 specifies the sheet feeding unit and sheet exhausting unit once a printing start command is outputted from host device 2.

When a sheet of paper 60 is to be printed, printing data format is outputted from host device 2 and supplied to main control unit 50 under a step 210. Such format data includes, but is not limited to, the size of the printing sheet, the sheet feeding unit and sheet exhausting unit. Once the data format is read by main control unit 50 and outputted to printing mechanism control unit 55, printing mechanism control unit 55 outputs command instructions to allow printing format data storage circuit 57 to save in advance of printing the printing format data matching to a number of pages to be printed under a step 220. Main control unit 50 controls the saving of printing data sent from host device 2 in a buffer (not shown). When the transfer of printing data matching to one page is finished, main control unit 50 controls the outputting of the command to printing mechanism control unit 55 to start printing. Data matching to the second page is then saved in the buffer. Saving of the printing data occurs under a step 230.

Printing mechanism control unit 55 then reads out the printing format data saved in printing format data storage circuit 57. Based on the printing format data, printing mechanism control unit 55 generates output signals associated with the speed of revolution of motor 83 for driving rotary polygon mirror 73, a reference timing signal matched to the scanning start position of the optical beam, the speed of revolution of photosensitive drum 14, the timing signals of electrostatic charging unit 15, toner developing device 17 and transfer device 18 of printing mechanism 10 all under a step 240. At the same time control signals are output at terminal 58 of printing mechanism control unit 55 to control unit II of automatic sheet feeder 3 and control unit III of sorter 4.

Automatic sheet feeder 3 operates driving motor 77 based on the timing signal provided from printing mechanism control unit 55 and draws an individual sheet of paper 60 for printing from stackers 32 or 33. The sheet of paper 60 is advanced by sheet exhausting rollers 34 and 35 until the individual sheet of paper is fully fed into sheet feeding port 11 of printer 1. As the sheet of paper 60 is advanced through sheet feeding port 11, the sheet is temporarily positioned on gate roller 20 and is detected by a sheet detector 21 which outputs a signal representing the position of the sheet of paper 60 on gate roller 20, all under step 240.

When the foregoing preparation for printing is finished, printing mechanism control unit 55 controls the outputting of a printing data transfer request to main control unit 50. Main control unit 50, in response to the printing data transfer request, outputs the printing data stored in its buffer to printing mechanism control unit 55 also under step 240.

Printing mechanism control unit 55 operates gate roller 20 to advance the temporarily held sheet of paper 60 along printing path 13. In synchronization with the advancement of the sheet of paper 60 beyond gate roller 20, the printing data is provided to optical signal generating unit 19 for forming a latent image of the printing data on photosensitive drum 14. Such synchronization is based on printing mechanism control unit 55 controlling the peripheral speed of gate roller 20.

The latent image is supplied to toner developing device 17 at a peripheral speed of photosensitive drum 14 based on command instructions from printing mechanism control unit 55. Toner developing device 17 converts the latent image to a toner image on photosensitive drum 14. At the transfer area along path 13 between transfer device 18 and photosensitive drum 14 the toner image is transferred onto the sheet of paper 60 also under step 240.

Once the sheet of paper 60 is advanced beyond the transfer area, the image is fixed on the surface of the sheet of paper 60 by fixing unit 21 so that the toner is permanently affixed to the sheet of paper. Thereafter, the permanently affixed image on the sheet of paper 60 is discharged from printer 1 by sheet exhausting rollers 22 through sheet exhausting port 12.

Sorter unit 4 positions classifying plate 92 in synchronism with the sheet of paper 60 which is discharged from printer 1 through sheet exhausting port 12 based on the timing signal supplied from printing mechanism control unit 55. When printing of the first sheet of paper is completed and has been discharged by printer 1, sorter 4 first receives the sheet of paper 60 on classifying plate 92 and then distributes the sheet to a tray associated with the first sheet under step 240.

Once the first sheet of paper 60 has travelled by photosensitive drum 14, printing mechanism control circuit 55 outputs a next page printing enable signal to main control unit 50 and then requests a printing start command for the second page from main control unit 50. Printing mechanism control unit 55 then reads the format data for the second sheet from format data storage circuit 57 without instruction from main control unit 50 (i.e., independent from instructions by main control unit 50) under a step 250. Printing mechanism control unit 55 is now ready for the next printing operation which will be initiated once the second page printing start command is received from main control unit 50.

When transfer of the printing data from host device 2 is completed, main control unit 50 outputs the printing starting command. In response to this command, printing mechanism control unit 55 directs the feeding of a sheet of paper 60 from automatic sheet feeder 3 based on the printing format data which has been read by minicomputer 56 from format data storage circuit 57. The sheet of printed paper 60 is then discharged from printer 1 to sorter unit 4.

Optional devices such as automatic sheet feeder 3 and sorter 4 can be replaced with other optional devices or accessories (i.e., external devices) for changing the configuration of system 100. The optional devices are mechanically connected to printer 1 and to control unit I in a daisy-chain manner through signal cables 61-64. Initial operation of printing system 100 with the replaced/new optional devices begins with control unit I of printer 1 sending a new inquiry signal for the specifications of newly mounted optional devices. Control units II and III, which are within the newly mounted external optional devices, will supply the specification data saved in specification data storage circuits 31 and 41, respectively, to printing mechanism control unit 55 along signal cables 63 and 64 in a daisy-chain manner. Printer 1 will save the specification data of these newly mounted external units 3 and 4 in data specification storage circuit 51. Accordingly, the updated system environment based on newly mounted external units 3 and 4 will be stored within control unit I of printer 1.

As now can be readily appreciated, the speed at which printer 1 prints information on a sheet of paper is independent of the particular specifications associated with an external unit (i.e., printing sheet handling device) such as automatic sheet feeder 3 or sorter 4. Printer 1 is typically, but not limited to, a page-type printer. Control unit I of printer 1 is separated into a control circuit section (i.e., main control unit 50) and a printing mechanism control circuit section (i.e., printing mechanism control unit 55). Main control unit 50 is responsible for receiving and processing printing data from host device 2. Printing mechanism control unit 55, which serves as an auxiliary control unit for printing mechanism 10, provides a printing format data storage area (i.e., format data storage circuit 57) for saving the format for a number of pages and serves to control the storage area for the data specifications of the external units. Printing mechanism 10 is controlled by the data to be printed. Since the printing process except for transmission of the printing data can be controlled based on the timing of printing mechanism 10, the invention provides an extremely efficient printing system. By providing one or more timing signals from control unit I to the optional device (i.e., external print sheet handling devices) which are attached to printer 1, these external units can be operated more efficiently based on the timing signals from printing mechanism control unit I to improve the compatibility of these external unit with printer 1.

Control unit I of printer 1 includes a main control unit 50 and an auxiliary control unit (i.e., printing mechanism control unit 55). The auxiliary control unit stores the data specifications of the external units such that a standardized control unit I is provided. Accordingly, a less costly printing system which has a high degree of compatibility is provided.

It will thus be seen that the objects set forth above and those made apparent from the preceding description are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. An image forming apparatus in combination with at least one optical device and an external device, comprising:

recording means for recording images on pages of recording medium based on recording data;

first control means for storing at least two pages of recording data and associated format data from the external device and for inspecting specifications of said at least one optional device; and second control means for controlling operation of said recording means and said at least one optional device based on said associated format data and specifications of said at least one optional device, said second control means including first storage means for storing format data associated with at least two pages of recording data provided by said first control means and second storage means for storing specifications of said at least one optional device.

2. The image forming apparatus as claimed in claim 1, wherein said image forming apparatus is a page-type printer.

3. The image forming apparatus as claimed in claim 2, wherein said at least one optional device includes at least one of an automatic sheet feeder and a sorter.

4. The image forming apparatus as claimed in claim 1, wherein said second control means includes means for producing a timing signal to coordinate the operation of said recording means and said at least one optional device.

5. The image forming apparatus as claimed in claim 4, wherein said at least one optional device includes means for receiving the timing signal produced by said second control means.

6. The image forming apparatus as claimed in claim 4, wherein said at least one optional device includes at least one of an automatic sheet feeder and a sorter.

7. The image forming apparatus as claimed in claim 6, wherein said external device includes a host computer.

8. The image forming apparatus as claimed in claim 7, wherein said recording means includes an optical beam write means for producing a modulated light beam representing the recording data, photosensitive drum means for receiving said modulating light beam to form a latent image thereon; toner developing means for depositing toner on said photosensitive drum means to change said latent image to a toner image, transfer means for transferring the toner image to said recording medium and fixing means for permanently fixing said toner image to said recording medium.

9. The image forming apparatus as claimed in claim 8, wherein said first storage means is operable for producing instructions and wherein said second storage means stores specifications of said at least one optional device according to said instructions from said first control means.

10. The image forming apparatus as claimed in claim 4, wherein said at least one optional device includes a specification storage circuit.

11. The image forming apparatus as claimed in claim 1, wherein said at least one optional device includes at least one of an automatic sheet feeder and a sorter.

12. The image forming apparatus as claimed in claim 1, wherein said at least one optional device includes a specification storage circuit.

13. The image forming apparatus as claimed in claim 12, wherein said at least one optional device includes means for receiving the timing signal produced by said second control means.

14. The image forming apparatus as claimed in claim 1, wherein said external device includes a host computer.

15. The image forming apparatus as claimed in claim 1, wherein said recording means includes an optical beam write means for producing a modulated light beam representing the recording data, photosensitive drum means for receiving said modulating light beam to form a latent image thereon; toner developing means for depositing toner on said photosensitive drum means to change said latent image to a toner image, transfer means for transferring the toner image to said recording medium and fixing means for permanently fixing said toner image to said recording medium.

16. The image forming apparatus as claimed in claim 1, wherein said first storage medium is operable for producing instructions and wherein said second storage means stores specifications of said at least one optional device according to said instructions from said first control means.

17. An image forming apparatus in combination with at least one optional device and an external device, comprising:
  recording means for recording images on pages of recording medium based on recording data;
  first control means for storing at least two pages of recording data and associated format data from the external device and for inspecting specifications of said at least one optional device; and
  second control means for controlling operation of said recording means and said at least one optional device based on said associated format data, said second control means including storage means for storing format data associated with at least two pages of said recording data provided by said first control means.

18. The image forming apparatus as claimed in claim 17, wherein said image forming apparatus is a page-type printer.

19. The image forming apparatus as claimed in claim 18, wherein said second control means includes means for producing a timing signal to coordinate the operation of said recording means and said at least one optional device.

20. The image forming apparatus as claimed in claim 19, wherein said at least one optional device includes at least one of an automatic sheet feeder and a sorter.

21. The image forming apparatus as claimed in claim 20, wherein said external device includes a host computer.

22. The image forming apparatus as claimed in claim 21, wherein said recording means includes an optional beam write means for producing a modulated light beam representing the recording data, photosensitive drum means for receiving said modulated light beam to form a latent image thereon; toner developing means for depositing toner on said photosensitive drum means to change said latent image to a toner image, transfer means for transferring the toner image to said recording medium and fixing means for permanently fixing said toner image to said recording medium.

23. The image forming apparatus as claimed in claim 17, wherein said second control means includes means for producing a timing signal to coordinate the operation of said recording means and said at least one optional device.

24. The image forming apparatus as claimed in claim 17, wherein said at least one optional device includes at least one of an automatic sheet feeder and a sorter.

25. The image forming apparatus as claimed in claim 17, wherein said external device includes a host computer.

26. The image forming apparatus as claimed in claim 17, wherein said recording means includes an optical beam write means for producing a modulated light beam representing the recording data, photosensitive drum means for receiving said modulated light beam to form a latent image thereon; toner developing means for depositing toner on said photosensitive drum means to change said latent image to a toner image, transfer means for transferring the toner image to said recording medium and fixing means for permanently fixing said toner image to said recording medium.

27. An image forming apparatus in combination with at least one optional device and an external device, comprising:
   recording means for recording images on pages of recording medium based on recording data;
   first control means for storing at least two pages of recording data and associated format data from the external device and for inspecting specifications of said at least one optional device; and
   second control means for controlling operation of said recording means and said at least one optional device based on said associated format data and specifications of said at least one optional device, said second control means including storage means for storing specifications of said at least one optional device.

28. The image forming apparatus as claimed in claim 27, wherein said image forming apparatus is a page-type printer.

29. The image forming apparatus as claimed in claim 28, wherein said second control means includes means for producing a timing signal to coordinate the operation of said recording means and said at least one optional device.

30. The image forming apparatus as claimed in claim 29, wherein said at least one optional device includes at least one of an automatic sheet feeder and a sorter.

31. The image forming apparatus as claimed in claim 30, wherein said at least one optional device includes a specification storage circuit.

32. The image forming apparatus as claimed in claim 31, wherein said at least one optional device includes means for receiving the timing signal produced by said second control means.

33. The image forming apparatus as claimed in claim 32, wherein said external device includes a host computer.

34. The image forming apparatus as claimed in claim 33, wherein said recording means includes an optical beam write means for producing a modulated light beam representing the recording data, photosensitive drum means for receiving said modulated light beam to form a latent image thereon; toner developing means for depositing toner on said photosensitive drum means to change said latent image to a toner image, transfer means for transferring the toner image to said recording medium and fixing means for permanently fixing said toner image to said recording medium.

35. The image forming apparatus as claimed in claim 27, wherein said second control means includes means for producing a timing signal to coordinate the operation of said recording means and said at least one optional device.

36. The image forming apparatus as claimed in claim 27, wherein said at least one optional device includes at least one of an automatic sheet feeder and a sorter.

37. The image forming apparatus as claimed in claim 27, wherein said at least one optional device includes a specification storage circuit.

38. The image forming apparatus as claimed in claim 27, wherein said at least one optional device includes means for receiving the timing signal produced by said second control means.

39. The image forming apparatus as claimed in claim 27, wherein said external device includes a host computer.

40. The image forming apparatus as claimed in claim 27, wherein said recording means includes an optical beam write means for producing a modulated light beam representing the recording data, photosensitive drum means for receiving said modulated light beam to form a latent image thereon; toner developing means for depositing toner on said photosensitive drum means to change said latent image to a toner image, transfer means for transferring the toner image to said recording medium and fixing means for permanently fixing said toner image to said recording medium.

* * * * *